(12) United States Patent
Flockhart et al.

(10) Patent No.: US 7,770,175 B2
(45) Date of Patent: Aug. 3, 2010

(54) METHOD AND APPARATUS FOR LOAD BALANCING WORK ON A NETWORK OF SERVERS BASED ON THE PROBABILITY OF BEING SERVICED WITHIN A SERVICE TIME GOAL

(75) Inventors: Andrew D. Flockhart, Thornton, CO (US); Larry John Roybal, Westminster, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1925 days.

(21) Appl. No.: 10/673,118

(22) Filed: Sep. 26, 2003

(65) Prior Publication Data

US 2005/0071844 A1 Mar. 31, 2005

(51) Int. Cl.
*G06F 9/46* (2006.01)
*H04M 3/00* (2006.01)
*H04M 5/00* (2006.01)

(52) U.S. Cl. .............. 718/105; 379/265.11; 379/266.03
(58) Field of Classification Search ......... 718/104–105; 379/265, 266; 370/429
See application file for complete search history.

(56) References Cited

U.S. PATENT DOCUMENTS

| | | |
|---|---|---|
| 4,163,124 A | 7/1979 | Jolissaint |
| 4,389,400 A | 6/1983 | Ho |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |

(Continued)

FOREIGN PATENT DOCUMENTS

CA 2143198 1/1995

(Continued)

OTHER PUBLICATIONS

Dinda, Peter A., "A Prediction-based Real-time Scheduling Advisor", 2002, pp. 1-8.*

(Continued)

*Primary Examiner*—Meng-Ai An
*Assistant Examiner*—Eric C Wai
(74) *Attorney, Agent, or Firm*—Sheridan Ross P.C.

(57) ABSTRACT

The present invention is directed to balancing resource loads. In particular, the present invention is directed to assigning work to service locations having the greatest probability of servicing the work within a target time. Because an average wait time is not necessarily equal to a probability of servicing work within a target time, the present invention is useful in meeting service target goals. Because the present invention operates by comparing the probability of a defined set of service locations to one another, absolute probabilities need not be calculated. Instead, relative probabilities may be used in assigning work.

32 Claims, 4 Drawing Sheets

U.S. PATENT DOCUMENTS

| | | | |
|---|---|---|---|
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,355,269 A | 10/1994 | Clausen | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | 379/266 |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | 379/266 |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,721,770 A | 2/1998 | Kohler | |
| 5,724,092 A | 3/1998 | Davidsohn et al. | |
| 5,740,238 A | 4/1998 | Flockhart et al. | 379/221 |
| 5,742,675 A | 4/1998 | Kilander et al. | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | 379/221 |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,818,907 A | 10/1998 | Maloney et al. | |
| 5,825,869 A | 10/1998 | Brooks et al. | 379/265 |
| 5,828,747 A | 10/1998 | Fisher et al. | 379/309 |
| 5,838,968 A | 11/1998 | Culbert | |
| 5,839,117 A | 11/1998 | Cameron et al. | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,901,214 A | 5/1999 | Shaffer et al. | |
| 5,903,641 A | 5/1999 | Tonisson | |
| 5,903,877 A | 5/1999 | Berkowitz et al. | 705/26 |
| 5,905,793 A | 5/1999 | Flockhart et al. | 379/266 |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,941,983 A | 8/1999 | Gupta et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | 379/266 |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,038,293 A | 3/2000 | Mcnerney et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | 370/412 |
| 6,052,723 A | 4/2000 | Ginn | |
| 6,055,308 A | 4/2000 | Miloslavsky et al. | |
| 6,058,179 A | 5/2000 | Shaffer et al. | |
| 6,064,730 A | 5/2000 | Ginsberg | |
| 6,064,731 A | 5/2000 | Flockhart et al. | 379/265 |
| 6,084,954 A | 7/2000 | Harless et al. | |
| 6,088,441 A | 7/2000 | Flockhart et al. | 379/265 |
| 6,097,885 A | 8/2000 | Rayner | |
| 6,115,462 A | 9/2000 | Servi et al. | |
| 6,151,571 A | 11/2000 | Pertrushin | |
| 6,154,769 A | 11/2000 | Cherkasova et al. | |
| 6,163,607 A | 12/2000 | Bogart et al. | 379/266 |
| 6,173,053 B1 | 1/2001 | Bogart et al. | 379/266 |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,192,122 B1 | 2/2001 | Flockhart et al. | 379/266 |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick | |
| 6,259,969 B1 | 7/2001 | Tackett et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley et al. | |
| 6,292,550 B1 | 9/2001 | Burritt | |
| 6,295,353 B1 | 9/2001 | Flockhart et al. | 379/265 |
| 6,353,810 B1 | 3/2002 | Petrushin | |
| 6,356,632 B1 | 3/2002 | Foster et al. | |
| 6,363,411 B1 | 3/2002 | Dugan et al. | |
| 6,366,668 B1 | 4/2002 | Borst et al. | 379/266.04 |
| 6,373,836 B1 | 4/2002 | Deryugin et al. | |
| 6,389,028 B1 | 5/2002 | Bondarenko et al. | |
| 6,389,132 B1 | 5/2002 | Price et al. | |
| 6,389,400 B1 | 5/2002 | Bushey et al. | |
| 6,424,709 B1 | 7/2002 | Doyle et al. | |
| 6,426,950 B1 | 7/2002 | Mistry | |
| 6,427,137 B2 | 7/2002 | Petrushin | |
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | 379/265.05 |
| 6,463,148 B1 | 10/2002 | Brady | |
| 6,463,346 B1 | 10/2002 | Flockhart et al. | 700/102 |
| 6,463,415 B2 | 10/2002 | St. John | |
| 6,480,826 B2 | 11/2002 | Pertrushin | |

| | | | |
|---|---|---|---|
| 6,487,290 B1 * | 11/2002 | Le Grand ............... 379/265.02 |
| 6,490,350 B2 | 12/2002 | McDuff et al. |
| 6,519,570 B1 | 2/2003 | Faber et al. |
| 6,535,600 B1 | 3/2003 | Fisher et al. |
| 6,535,601 B1 | 3/2003 | Flockhart et al. ....... 379/266.01 |
| 6,546,087 B2 | 4/2003 | Shaffer et al. |
| 6,560,329 B1 | 5/2003 | Draginich et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. ......... 379/265.1 |
| 6,584,191 B1 | 6/2003 | McPartlan et al. |
| 6,587,831 B1 | 7/2003 | O'Brien |
| 6,597,685 B2 | 7/2003 | Miloslavsky et al. |
| 6,614,903 B1 | 9/2003 | Flockhart et al. ....... 379/265.12 |
| 6,636,598 B1 | 10/2003 | Thomson et al. |
| 6,650,748 B1 | 11/2003 | Edwards et al. |
| 6,687,257 B1 * | 2/2004 | Balasubramanian ........ 370/429 |
| 6,704,409 B1 | 3/2004 | Dilip et al. |
| 6,714,643 B1 | 3/2004 | Gargeya et al. |
| 6,718,330 B1 * | 4/2004 | Zenner ........................ 707/10 |
| 6,748,414 B1 * | 6/2004 | Bournas ..................... 718/105 |
| 6,754,333 B1 | 6/2004 | Flockhart et al. |
| 6,801,520 B2 | 10/2004 | Philonenko |
| 6,850,613 B2 | 2/2005 | McPartlan et al. |
| 6,859,529 B2 | 2/2005 | Duncan et al. |
| 6,937,993 B1 | 8/2005 | Gabbita et al. |
| 6,968,509 B1 | 11/2005 | Chang et al. |
| 6,970,554 B1 | 11/2005 | Peterson et al. |
| 6,970,829 B1 | 11/2005 | Leamon |
| 7,013,344 B2 * | 3/2006 | Megiddo .................... 709/232 |
| 7,023,979 B1 | 4/2006 | Wu et al. |
| 7,035,808 B1 | 4/2006 | Ford |
| 7,043,007 B2 | 5/2006 | McPartlan et al. |
| 7,047,192 B2 | 5/2006 | Poirier |
| 7,050,566 B2 | 5/2006 | Becerra et al. |
| 7,068,775 B1 | 6/2006 | Lee |
| 7,072,966 B1 | 7/2006 | Benjamin et al. |
| 7,103,562 B2 | 9/2006 | Kosiba et al. |
| 7,127,058 B2 | 10/2006 | O'Connor et al. |
| 7,133,520 B1 | 11/2006 | Doyle et al. |
| 7,142,666 B1 | 11/2006 | Bates et al. |
| 7,158,628 B2 | 1/2007 | McConnell et al. |
| 7,200,219 B1 | 4/2007 | Edwards et al. |
| 7,269,253 B1 | 9/2007 | Wu et al. |
| 7,272,223 B2 | 9/2007 | McCormack et al. |
| 7,346,532 B2 | 3/2008 | Kusama et al. |
| 7,372,857 B1 | 5/2008 | Kappler et al. |
| 7,372,952 B1 | 5/2008 | Wu et al. |
| 7,373,309 B2 | 5/2008 | Nishikawa et al. |
| 7,382,773 B2 | 6/2008 | Schoeneberger et al. |
| 7,406,098 B2 | 7/2008 | Taneja et al. |
| 7,418,094 B2 | 8/2008 | Golitsin et al. |
| 7,478,051 B2 | 1/2009 | Nourbakhsh et al. |
| 7,551,602 B2 | 6/2009 | Whitman, Jr. |
| 2001/0040887 A1 | 11/2001 | Shtivelman et al. |
| 2001/0056349 A1 | 12/2001 | St. John |
| 2002/0002460 A1 | 1/2002 | Pertrushin |
| 2002/0002464 A1 | 1/2002 | Pertrushin |
| 2002/0010587 A1 | 1/2002 | Pertrushin |
| 2002/0029213 A1 | 3/2002 | Borissov et al. |
| 2002/0118816 A1 | 8/2002 | Flockhart et al. ....... 379/265.12 |
| 2002/0181692 A1 | 12/2002 | Flockhart et al. ....... 379/265.02 |
| 2002/0194002 A1 | 12/2002 | Petrushin |
| 2003/0016812 A1 | 1/2003 | Rodenbusch et al. |
| 2003/0026414 A1 | 2/2003 | Baker et al. |
| 2003/0095652 A1 | 5/2003 | Mengshoel et al. |
| 2003/0101213 A1 | 5/2003 | Wright |
| 2003/0123642 A1 | 7/2003 | Alvarado et al. ....... 379/266.01 |
| 2003/0152212 A1 | 8/2003 | Burok et al. ........... 379/265.02 |
| 2003/0154184 A1 | 8/2003 | Chee et al. |
| 2003/0169870 A1 | 9/2003 | Stanford |
| 2003/0177231 A1 | 9/2003 | Flockhart et al. ............ 709/225 |
| 2003/0182310 A1 | 9/2003 | Charnock et al. |
| 2003/0231647 A1 | 12/2003 | Petrovykh |
| 2004/0010437 A1 | 1/2004 | Kiran et al. |
| 2004/0230675 A1 | 11/2004 | Freimuth et al. |
| 2005/0004828 A1 | 1/2005 | deSilva et al. |
| 2005/0013428 A1 | 1/2005 | Walters |
| 2005/0041580 A1 | 2/2005 | Petrovykh |
| 2005/0065837 A1 | 3/2005 | Kosiba et al. |
| 2005/0071844 A1 | 3/2005 | Flockhart et al. |
| 2005/0129212 A1 | 6/2005 | Parker |
| 2005/0135593 A1 | 6/2005 | Becerra et al. |
| 2005/0135600 A1 | 6/2005 | Whitman |
| 2005/0135601 A1 | 6/2005 | Whitman |
| 2006/0015388 A1 | 1/2006 | Flockhart et al. |
| 2006/0045255 A1 | 3/2006 | Peters et al. |
| 2007/0192414 A1 | 8/2007 | Chen et al. |
| 2008/0275751 A1 | 11/2008 | Flockhart et al. |
| 2008/0275752 A1 | 11/2008 | Flockhart et al. |
| 2008/0275766 A1 | 11/2008 | Flockhart et al. |

FOREIGN PATENT DOCUMENTS

| | | |
|---|---|---|
| CA | 2174762 | 3/1996 |
| EP | 0 501 189 A2 | 9/1992 |
| EP | 0 740 450 A2 | 10/1996 |
| EP | 0 772 335 A2 | 5/1997 |
| EP | 0 829 996 A2 | 3/1998 |
| EP | 0 855 826 A2 | 9/1998 |
| EP | 0 863 651 A2 | 9/1998 |
| EP | 0 866 407 A1 | 9/1998 |
| EP | 0 899 673 A2 | 3/1999 |
| EP | 0 998 108 A1 | 5/2000 |
| EP | 1 091 307 A2 | 4/2001 |
| EP | 1 150 236 A2 | 10/2001 |
| EP | 1246097 | 10/2002 |
| GB | 2 273 418 | 6/1994 |
| GB | 2 290 192 A | 12/1995 |
| JP | H7-005907 | 1/1995 |
| JP | 2002-051149 | 2/2002 |
| JP | 2002-297900 | 10/2002 |
| WO | WO 96/07141 | 3/1996 |
| WO | WO 97/28635 | 8/1997 |
| WO | WO 98/56207 | 12/1998 |
| WO | WO 01/80540 A1 | 10/2001 |

OTHER PUBLICATIONS

U.S. Appl. No. 10/673,115, filed Sep. 26, 2003, Flockhart et al.
U.S. Appl. No. 10/673,103, filed Sep. 26, 2003, Flockhart et al.
U.S. Appl. No. 10/673,105, filed Sep. 26, 2003, Flockhart et al.
Avaya, Inc., Business Advocate Product Summary, available at http://www.avaya.com, downloaded on Feb. 15, 2003, Avaya, Inc. 2003.
Avaya, Inc., Business Advocate Options, available at http://www.avaya.com, downloaded on Feb. 15, 2003, Avaya, Inc., 2003.
Avaya, Inc., CentreVu Advocate, Release 9, User Guide, Dec. 2000.
"Chapter 9: Domain Name Services" (printed Mar. 31, 2003), at http://www.pism.com/chapt09/chapt09.html, 21 pages.
"Internet Protocol Addressing" (printed Mar. 31, 2003), at http://www.samspade.org/d/ipdns.html, 9 pages.
BellSouth "Frequently Asked Questions: Domain Name Service FAQs" (printed Mar. 31, 2003, at https://registration.bellsouth.net/NASApp/DNSWebUI/FAQ.jsp, 4 pages.
U.S. Appl. No. 10/427,813, filed Apr. 30, 2003, Chavez
Douglas W. Stevenson, et al.; "Name Resolution in Network and Systems Management Environments" (printed Mar. 31, 2003), at http://netman.cit.buffalo.edu/Doc/Dstevenson/NR-NMSE.html, 16 pages.
Sarah Ahmed; "A Scalable Byzantine Fault Tolerant Secure Domain Name System," Thesis submitted to Department of Electrical Engineering and Computer Science, Massachusetts Institute of Technology (Jan. 22, 2001), pp. 1-101.
Scott Coles; "A Guide for Ensuring Service Quality in IP Voice Networks," *Communication Without Boundaries*, Avaya White Paper (Jun. 2002), pp. 1-17.

"The Advantages of Load Balancing in the Multi-Call Center Enterprise," *Communication Without Boundaries*, Avaya White Paper (Feb. 2002), pp. 1-13.

Robin Foster, et al.; "Avaya™ Business Advocate and its Relationship to Multi-Site Load Balancing Applications," *Communication Without Boundaries* (Mar. 2002), pp. 1-13.

David Chavez, et al.; "Avaya MultiVantage™ Software: Adapting Proven Call Processing for the Transition to Converged IP Networks," *Communication Without Boundaries*, Avaya White Paper (Aug. 2002), pp. 1-17.

"Voice Over IP Via Virtual Private Networks: An Overview," *Communication Without Boundaries*, Avaya White Paper (Feb. 2001), pp. 1-8.

"Better Implementation of IP in Large Networks," Avaya Application Note (Apr. 19, 2002), pp. 1-14.

European Search Report dated Dec. 28, 2004 for European Patent Application No. EP 04 25 5373.

U.S. Appl. No. 10/946,638, Flockhart et al.

U.S. Appl. No. 11/069,739, Flockhart et al.

U.S. Appl. No. 11/064,367, Flockhart et al.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

Dawson, "NPRI's Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"VAST™, Voicelink Application Software for Teleservicing®," System Manager User's Guide, Digital Systems (1994), pp. ii, vii-ix, 1-2, 2-41 through 2-77.

GEOTEL Communications Corporation Web site printout entitled "Intelligent CallRouter" Optimizing the Interaction Between Customers and Answering Resources. 6 pages.

Examiner's Refusal Decision dated Jul. 4, 2005 in Japanese Patent App. No. 2000-34266.

Examiner's Refusal Decision for Japanese Patent Application No. 2000-34267 dated Mar. 9, 2005 with translation, 4 pages.

Avaya, Inc., "Better Implementation of IP in Large Networks," Avaya, Inc. 2002, 14 pages.

Avaya, Inc., "Voice Over IP Via Virtual Private Networks: An Overview," Avaya, Inc., Feb. 2001.

"eGain's Commerce 2000 Platform Sets New Standard for eCommerce Customer Communications," Business Wire (Nov. 15, 1999).

"When Talk Isn't Cheap," Sm@rt Reseller, v. 3, n. 13 (Apr. 3, 2000), p. 50.

Chavez, David, et al., "Avaya MultiVantage Software: Adapting Proven Call Processing for the Transition to Converged IP Networks," Avaya, Inc., Aug. 2002.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken," University of Erlangen-Nuremberg, Bavarian Research Centre for Knowledge-Based Systems, at http://www5.informatik.uni-erlangen.de/literature/psdir/1999/Noeth99:RIF.ps.gz, 8 pages.

Foster, Robin, et al., "Avaya Business Advocate and its Relationship to Multi-Site Load Balancing Applications," Avaya, Inc., Mar. 2002.

John H.L. Hansen et al., "Foreign Accent Classification Using Source Generator Based Prosodic Features," Robust Speech Processing Laboratory, Duke University Department of Electrical Engineering, (undated), pp. 1-4.

L.F. Lamel and J.L. Gauvain, "Language Identification Using Phone-Based Acoustic Likelihoods," ICASSP-94, 4 pages.

Levent M. Arslan et al., "Language Accent Classification in American English," Robust Speech Processing Laboratory, Duke University Department of Electrical Engineering, Technical Report RSPL-96-7, revised Jan. 29, 1996, pp. 1-16.

Levent M. Arslan, "Foreign Accent Classification in American English," Dissertation submitted to Department of Electrical Computer Engineering, Graduate School of Duke University, (1996), pp. 1-201.

MIT Project Oxygen, "Pervasive, Human-Centered Computing—Oxygen," MIT Laboratory for Computer Science, (Jun. 2000), pp. 1-15.

Presentation by Victor Zue, "The MIT Oxygen Project," MIT Laboratory for Computer Science, Cambridge, MA (Apr. 25-26, 2000), 9 pages.

Canadian Examiner's Report for Canadian Patent Application No. 2,479,102 dated Feb. 16, 2006.

European Examination Report for European App. No. 04255373.5 dated Jul. 21, 2005.

Further European Examination Report for European App. No. 04255373.5 dated Sep. 8, 2006.

Canadian Examiner's Report for Canadian Patent Application No. 2,479,102 dated Feb. 26, 2007.

Rabun, Andy and Jim Sommers. "Microsoft Project 98 Support Course", Microsoft Corporation. Jun. 1998, 879 pages.

"Microsoft Project 2000 Training Manual", Microsoft Corporation. 2000, 431 pages.

Spraetz, Out with the new, in with the old: A look at scheduling alternatives, Customer Inter@ction Solutions; Nov. 2001: 20,5.

www.EIX.com (1998-2002) (http://web.archive.org/web/20020803000353/http://www.iex.com): Totalview The Workforce Management Solution, TotalView Product Literature: The Perfect Fit.

www.EIX.com (1998-2002) (http://web.archive.org/web/20020803000353/http://www.iex.com): Totalview The Workforce Management Solution, TotalView Product Literature: TotalView's Agent Webstation.

Business Editors, Microdyne Outsourcing Rolls Out RightForce Workforce Management to Manage Bi-Coastal Contact Center and E-Services Staff Business Wire. New York: Dec. 4, 2001. p. 1.

Business Editors, High Tech Editors. IEX Enhances Award-Winning Workforce Management Solution Business Wire. New York: Jul. 31, 2001. p. 1.

Examiner's Office Letter (including translation) for Japanese Patent Application No. 2004-278927, mailed Nov. 21, 2007, pager 1-6.

U.S. Appl. No. 12/022,850, filed Jan. 30, 2008, Flockhart et al.

"Background of the Invention" of the above-captioned application (previously provided).

Examiner's Office Letter (including translation) for Japanese Patent Application No. 2004-278927, mailed Nov. 12, 2008, pager 1-4.

Judge et al., Agent-enhanced workflow, BT Technologies Journal, vol. 16 No. 3, 1998.

Evenson et al., Effective Call Center Management: Evidence from Financial Services, The Wharton Financial Institutions Center, Jan. 1999.

Eder, Johann et al. "Time Management in Workflow Systems." BIS'99 3rd International Conference on Business Information Systems (1999).

Morris et al., Sardine: Dynamic Seller Strategies in an Auction Marketplace, EC'OO, ACM, Oct. 17-20, 2000, p. 128-134.

Microsoft Corporation. "User's Guide: Microsoft Project: Business Project Planning System Version 4.1 for Windows 95 or Version 4.0 for Windows 3.1." 1995. pp. 1-40 (Chapters 1-4).

* cited by examiner

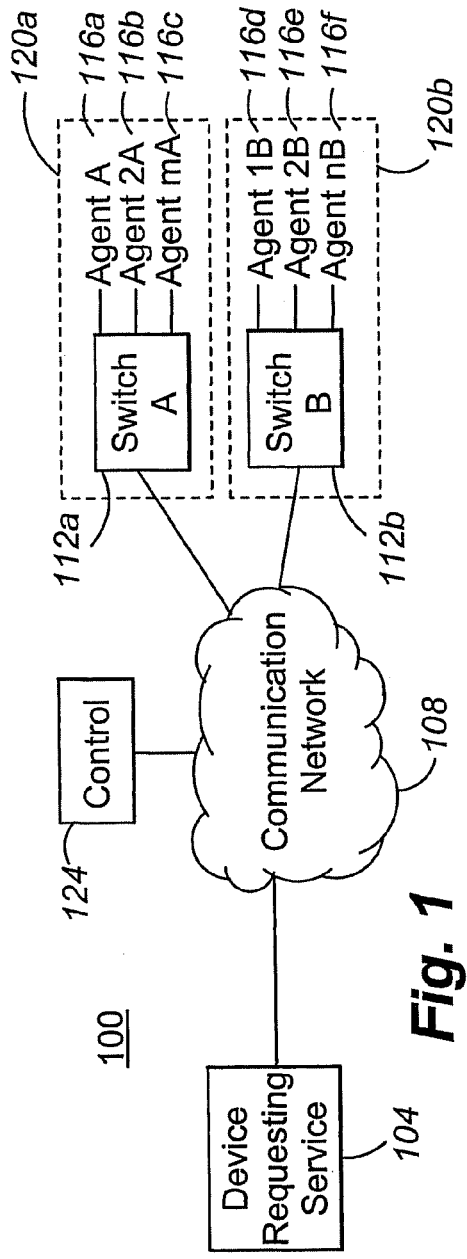
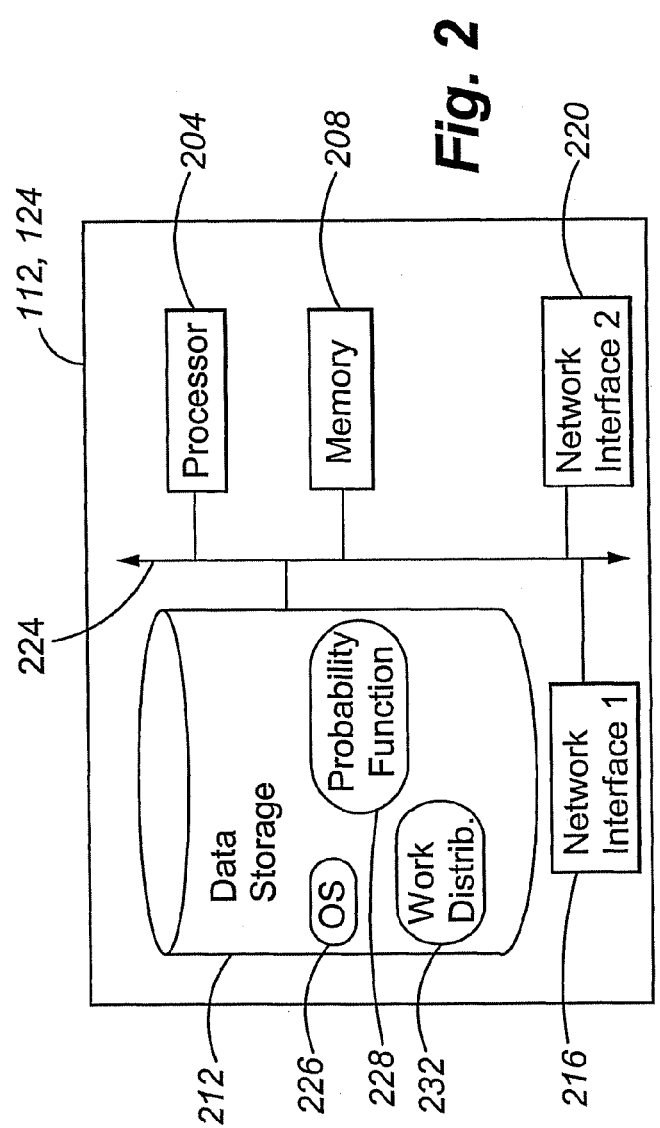

METHOD AND APPARATUS FOR LOAD BALANCING WORK ON A NETWORK OF SERVERS BASED ON THE PROBABILITY OF BEING SERVICED WITHIN A SERVICE TIME GOAL

FIELD OF THE INVENTION

The present invention is related to a method and apparatus for load balancing work. In particular, the present invention is directed to load balancing work based on a relative probability that a server will service work within a predetermined interval.

BACKGROUND OF THE INVENTION

Call centers are systems that enable a pool of agents to serve incoming and/or outgoing calls, with the calls being distributed and connected to whichever of the agents happen to be available at the time. When no agents are free and available to handle additional calls, additional incoming calls are typically placed in a holding queue to await an available agent. It is common practice to divide the pool of agents into a plurality of groups, commonly referred to as splits, and to assign different types of calls to different splits. For example, different splits may be designated to handle calls pertaining to different client companies, or calls pertaining to different products or services of the same client company. Alternatively, the agents in different splits may have different skills, and calls requiring different ones of these skills are then directed to different ones of these splits. Each split typically has its own incoming call queue.

Furthermore, some large companies find it effective to have a plurality of call centers, each for handling calls within a different geographical area, for example, Each call center, or each split within each call center, typically has its own incoming call queue. In a multiple queue environment, it can happen that one call center or split is heavily overloaded with calls and has a full queue of calls waiting for an available agent, while another call center or split may be only lightly overloaded and yet another call center or split may not be overloaded at all and actually may have idle agents. To alleviate such inefficiencies, some call centers have implemented a capability whereby, if the primary (preferred) split or call center for handling a particular call is heavily overloaded and its queue is overflowing with waiting calls, the call center evaluates the load of the other (backup) splits or call centers to determine if one of the other splits or call centers is less busy and consequently may be able to handle the overflow call and do so more promptly. The overflow call is then queued to the first such backup split or call center that is found, instead of being queued to the primary split or call center. Such arrangements are known by different names, one being "Look Ahead Interflow."

In order to balance work across a network of call centers, the decision as to where a call should be routed is typically made based on the estimated waiting time that a call will experience with respect to a particular switch. The objective is to find the switch within a network of switches where it is predicted that the call will be answered in the shortest period of time. In situations where an enterprise has contracted with its customers to service calls within a given period of time, sending calls to the switch with the shortest waiting time does not necessarily maximize the number of customers who are serviced within the contracting period. In particular, although doing so will generally reduce the average waiting time of calls, this is not the same as maximizing the number of calls serviced within the contracted time.

SUMMARY OF THE INVENTION

The present invention is directed to solving these and other problems and disadvantages of the prior art. Generally, according to the present invention, work (e.g., a call) is routed to a server (e.g., a switch) based on the probability that the work will be serviced within a contracted time interval. In particular, the work may be routed to the server having the highest probability for servicing the work based on the relative probabilities of each server in the network to service the work within a target service time goal. In accordance with another embodiment of the present invention, work may be routed to the server identified as having a sufficient probability of servicing the work within a target service time goal. Accordingly, the present invention is capable of efficiently routing work, and does so without performing a complicated calculation of absolute probability. Instead, only the relative probabilities need to be determined.

In accordance with an embodiment of the present invention, in response to receiving a work request, the probability of servicing the work request within a target time is determined for each server in a network. The server having the greatest determined probability of servicing the work request within the target time, or having a sufficient determined probability of servicing the work request within the target time, is selected, and the work request is assigned to the selected server. In accordance with an embodiment of the present invention, the relative probability that each server will complete the work request within the target time is calculated, rather than an absolute probability, thereby reducing the computational overhead of a method or apparatus in accordance with the present invention.

In accordance with still another embodiment of the present invention, the probability of servicing the work request within a target time is determined for a server by calculating a number of opportunities to service the work request within the target time with respect to the server. If more than one server has a greatest number of opportunities to service the work request within the target time, or if more than one server has a sufficient number of probabilities to service the work request within the target time, one of the servers may be selected by calculating an advance time metric. For instance, in accordance with an embodiment of the present invention, the server having the lowest expected wait time may be selected. In accordance with another embodiment of the present invention, the server having the lowest weighted advance time trend is selected.

In accordance with another embodiment of the present invention, a load balancing or work allocation apparatus is provided that includes a plurality of service locations. At least one service resource is associated with each of the service locations. In addition, a communication network interface is provided, operable to receive requests. A provided controller assigns the work request received at the communication network interface to the service location having the highest probability or to a service location having a sufficient probability of servicing the work request within a predetermined target time.

These and other advantages and features of the invention will become more apparent from the following description of an illustrative embodiment of the invention taken together with the drawings.

BRIEF DESCRIPTION OF THE DRAWINGS

FIG. 1 is a block diagram of a communication arrangement incorporating a system in accordance with an embodiment of the present invention;

FIG. 2 is a block diagram depicting a switch in accordance with an embodiment of the present invention;

DETAILED DESCRIPTION

Figure 3:
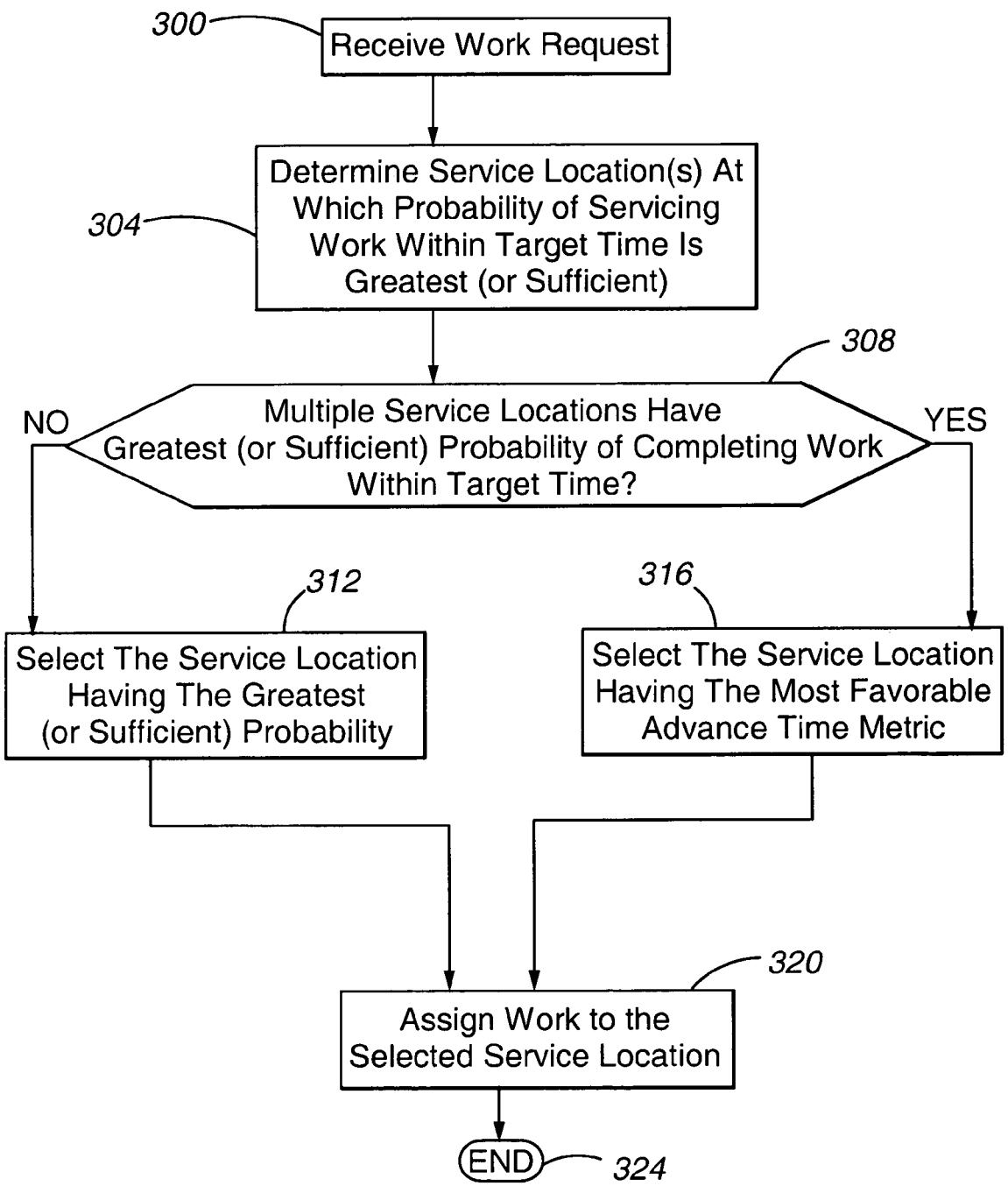
FIG. 3 is a flow chart depicting the assignment of work based on probability in accordance with an embodiment of the present invention.

With reference now to FIG. 1, a communication arrangement incorporating a system 100 in accordance with the present invention is illustrated. In general, the communication arrangement includes a device requesting service 104 interconnected to a communication network 108. The communication network 108 is in turn connected to a number of switches 112. Associated with each switch 112 are one or more resources 116, depicted in FIG. 1 as agents. Collectively, a switch 112 and associated resources 116 comprise a service location 120. In accordance with a further embodiment of the present invention, a service location 120 may comprise a switch 112 and a subset of the associated resources 116 established or functioning as a split. For purposes of this discussion, the term "service location" is understood to include a split. Accordingly, as can be appreciated by one of skill in the art, a system 100 in accordance with the present invention may be beneficially used to allocate requests for service among splits established with respect to resources 116 associated with a single switch 112. A system 100 in accordance with the present invention may also include a control 124.

The device requesting service 104 may comprise any device in connection with which a resource 116 is desired or required. Accordingly, a device requesting service 104 may include a telephone or other communication device associated with a user, or a computing or information device associated with a user or operating autonomously.

The communication network 108 may include a public switched telephone network (PSTN), a packet data network such as a local area network, an intranet, or the Internet, or any combination of communication networks.

The switches 112, as will be described in greater detail below, may include servers, including communication servers, such as private branch exchanges or call center servers, including but not limited to automatic call distribution systems. In general, the switches 112 operate to receive requests for service from a requesting device 104 that is delivered to the switch 112 by the communication network 108. In addition, the switches 112 operate to allocate an appropriate resource 116 to service the request. In accordance with an embodiment of the present invention, a switch 112 may function to allocate requests for service to resources 116 directly associated with the switch 112, or to resources 116 associated with another switch 112. Accordingly, the functions of the optional control 124 may be incorporated into one or more of the switches 112.

The control 124 may be provided for allocating requests for service among switches 112, or among splits comprising a group of resources 116 established in connection with one or more switches 112. Furthermore, requests for service may be placed in queues established with respect to each service location 120 or split included in a system 100. A control 124 may function to calculate the probability that each switch and/or split 112 that is a candidate for servicing a request will be successful at servicing such request within a target time, as will be described in greater detail below. Alternatively, the function of the control 124 may be performed by a switch 112 incorporating such functionality. In general, the control 124 may comprise a server computer in communication with the switches 112 either directly or through a network, such as the communication network 108.

With reference now to FIG. 2, a server, such as a switch 112 or a control 124, is illustrated. In general, the server 112, 124 may comprise a general purpose computer server. For example, the server 112, 124 may comprise a general purpose computer running a WINDOWS operating system. As yet another example, when implemented as a switch 112, the server may comprise a call center server, a telecommunications switch, or a private branch exchange. As shown in FIG. 2, a server 112, 124 may include a processor 204, memory 208, data storage 212, a first network interface 216, and optionally a second network interface 220. The various components 204-220 may be interconnected by a communication bus 224.

The processor 204 may include any processor capable of performing instructions encoded in software. In accordance with another embodiment of the present invention, the processor 204 may comprise a controller or application specific integrated circuit (ASIC) having and capable of performing instructions encoded in logic circuits. The memory 208 may be used to store programs or data, including data comprising a queue or queues, in connection with the running of programs or instructions on the processor 204. The data storage 212 may generally include storage for programs and data. For example, the data storage 212 may store operating system code 226, and various applications, including a probability function application 228 and a work distribution application 232, capable of execution by the processor 204. The first network interface 216 may be provided to interconnect the server 112, 124 to other devices either directly or over a computer or communication network, such as communication network 108. The server 112, 124 may include an additional network interface 220, for example where the server 112, 124 functions as a call center switch 112 that serves to interconnect the switch 112 to the communication network 108 and to service resources 116.

As can be appreciated by one of skill in the art, the actual implementation of a server 112, 124 may vary depending on the particular application. For example, a switch 112 that does not compute a relative probability as described herein would not require a probability function application 228. Similarly, a server comprising a control 124 would generally feature only a single network interface 216. In addition, a server 112, 124 with a processor 204 comprising a controller or other integrated device need not include memory 204 and/or data storage 212 that is separate from the processor 204.

With reference now to FIG. 3, a flow chart depicting the allocation of work to one of a plurality of service locations is illustrated. Initially, at step 300, a work request is received. In general, the work request may be received at a switch 112, or at a control 124. At step 304, the service location(s) 120 at which the probability of servicing the work associated with the received work request within a target time is greatest is determined. According to another embodiment of the present invention, the service location(s) 120 at which the probability of servicing the work within the target time is sufficient is determined at step 304. A sufficient probability is, according to an embodiment of the present invention, a selected number of opportunities for the work to be served within the target time. For example, three opportunities to service work within the target time may be deemed to represent a "sufficient probability" for servicing the work. The probability that is determined is not required to be an absolute probability. Accordingly, as described in greater detail below, the determination of the service location 120 having the greatest probability for servicing the work within the target time, or the identification of a service location 120 having a sufficient probability of servicing the work within the target time, may be made from the relative probability that an eligible service location 120 will complete the work within the target time.

At step 308, a determination is made as to whether multiple service locations 120 are determined to have the greatest probability or a sufficient probability of servicing the work within the target time. If only one service location 120 has the greatest probability or a sufficient probability of servicing the work within the target time, that one service location 120 is selected (step 312). If multiple service locations have been determined to have the greatest probability of servicing the work within the target time, (i.e. if the greatest probability is calculated with respect to multiple service locations), or if multiple service locations have a sufficient probability of servicing the work within the target time, the service location 120 having the most favorable advance time metric is selected from the multiple service locations 120 having the greatest or sufficient probability of servicing the work within the target time (step 316). At step 320, the work is assigned to the service location 120 selected at step 312 (if only one service location 120 has the greatest probability or a sufficient probability of servicing the work within the target time) or to the service location 120 selected at step 316 as having the most favorable advance time metric (if multiple service locations 120 were determined to have a greatest probability or a sufficient probability of servicing the work within the target time). The process of assigning a work request then ends (step 324), at least until a next service request is received or generated.

Figure 4:
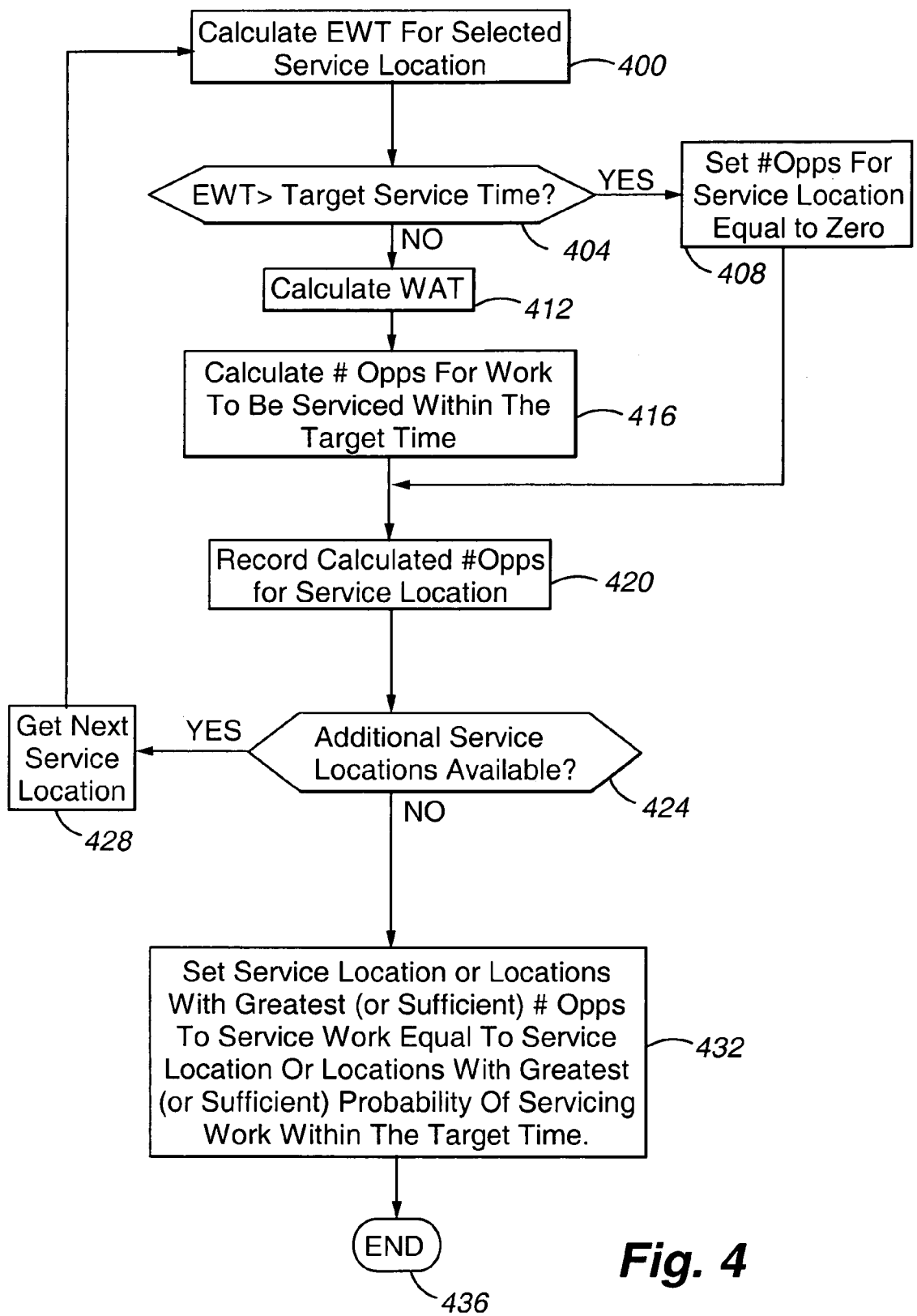
FIG. 4 is a flow chart depicting determining a probability in accordance with an embodiment of the present invention.

With reference now to FIG. 4, the determination of the probability that a service location 120 will be able to service work within a target time relative to other service locations 120 in accordance with an embodiment of the present invention is illustrated. Initially, at step 400, the estimated wait time (EWT) for a selected service location 120 is calculated. The estimated wait time may be calculated using various methods known to the art. For example, the estimated wait time may be calculated by determining an average rate of advance for a service location 120, and in particular for a queue established in connection with a service location 120, by multiplying the average rate of advance by the position of the next work request to be received, as described in U.S. Pat. No. 5,506,898, the disclosure of which is incorporated herein by reference in its entirety.

At step 404, a determination is made as to whether the estimated wait time is greater than the target service time that has been established. If the estimated wait time at the service location 120 exceeds the target service time, the number of opportunities for servicing a work request within the target time (#OPPS) is set to zero (step 408). If the estimated wait time is not greater than the target service time, the weighted advance time (WAT) for the queue associated with the service location 120 is calculated (step 412). The weighted advance time is the measure of the average time that is required for a work request to advance one position in the queue. Accordingly, the weighted advance time may be calculated as a continuously updated average advance time. As can be appreciated by one of ordinary skill in the art, the time period over which advance times are averaged for a queue can be varied.

At step 416, the number of opportunities for work to be serviced within the target time is calculated. In accordance with an embodiment of the present invention, the calculation of opportunities for work to be serviced within the target time is calculated using the algorithm: #OPPS=((Target time−EWT)/WAT)+1, where Target time is the target time for servicing the work. The number of opportunities for the queue associated with the service location 120 set or determined at step 408 or step 416 is then recorded (step 420).

After recording the calculated number of opportunities for the service location 120, a determination is made as to whether queues associated with additional service locations 120 are applicable to the work request (i.e. are eligible) (step 424). If additional service locations 120 are available, the next service location is gotten (step 428) and the system returns to step 400. If additional service locations are not available, the service location or locations 120 having the greatest number of opportunities to service the work request, or the location or locations 120 having a sufficient probability of servicing the work request, are set equal to the location or locations 120 having the greatest probability (or sufficient probability) of servicing the work request within the target time (step 432). In accordance with an embodiment of the present invention, a service location 120 having a sufficient probability may be identified by comparing a calculated number of opportunities for that service location 120 to a preselected number of opportunities deemed to correspond to a sufficient probability. The process for determining the relative probabilities of service locations 120 then ends (step 436).

The method generally set forth in connection with the flow chart shown in FIG. 4 is suitable for use in connection with step 304 of FIG. 3.

Figure 5:
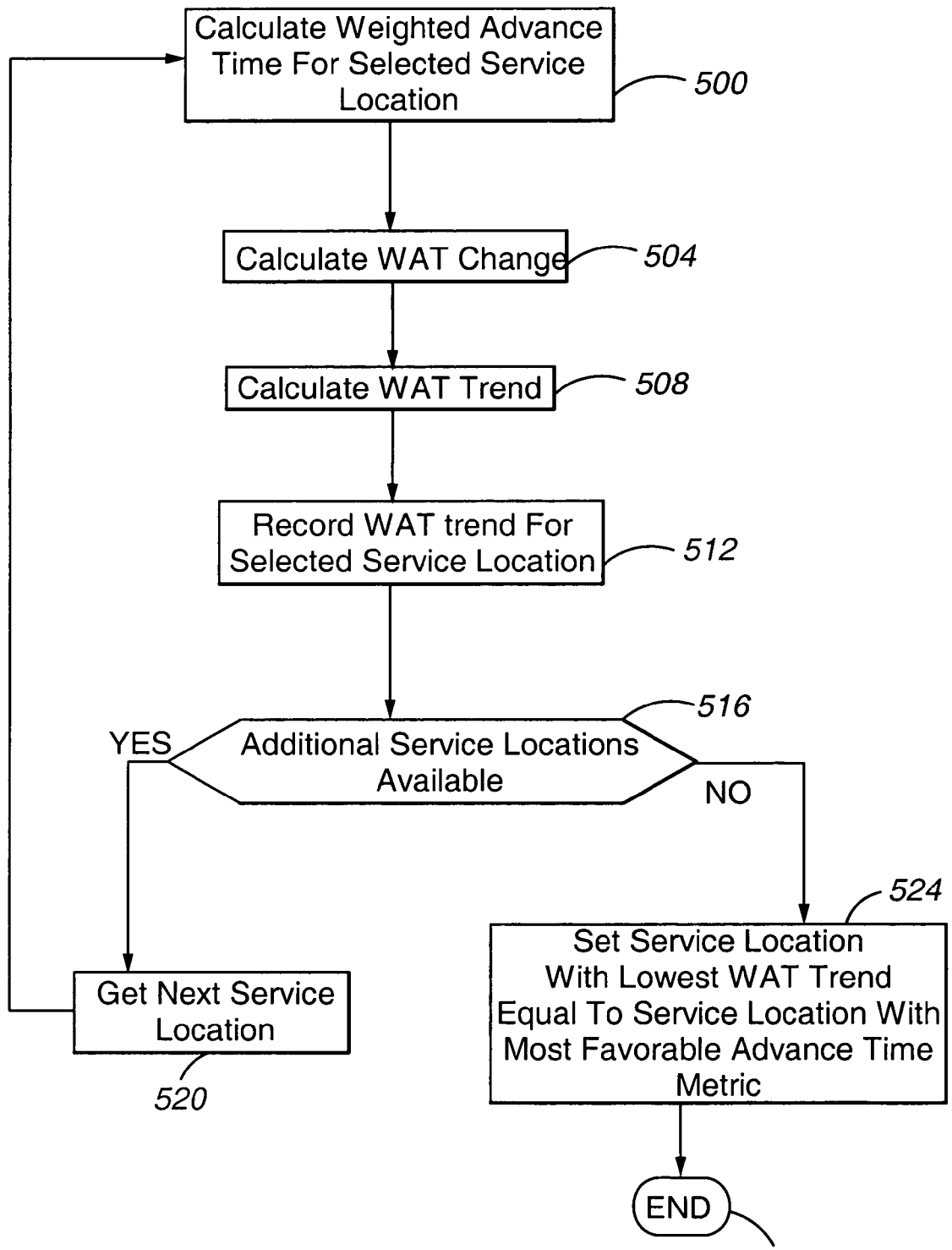
FIG. 5 is a flow chart depicting the calculation of an advance time metric in accordance with an embodiment of the present invention.

With reference now to FIG. 5, the calculation of an advance time metric in accordance with an embodiment of the present invention is illustrated. In particular, FIG. 5 illustrates a method for calculating an advance time metric comprising a weighted advance time trend, and can be used to select a single service location 120 from a number of service locations 120 in connection with step 316 of FIG. 3. Initially, at step 500, the weighted advance time for a service location 120 is calculated. In general, the calculation of the weighted advance time for a particular service location 120 will have been performed as part of determining the relative probability that the service location 120 will complete a work request within the target time. Accordingly, the WAT may be received 10 at step 500. At step 504, the WAT change is calculated. The WAT change may be calculated as: WAT_Change=(WAT$_n$−WAT$_{n-1}$)/WAT$_{n-1}$. For example, if at time 'n−1' WAT=10, and then at time 'n' WAT=9, WAT_Change=(9-10)/10=−0.1. A negative number means that WAT is trending downwards, by a ratio of 0.1 in this case. That is, the WAT has become 10% smaller. At step 508, the WAT trend is calculated. The WAT trend is an exponential moving average of the WAT changes. The WAT trend may be calculated as WAT_Trend$_n$= (x*WAT_Trend$_{n-1}$)+((1−x)*WAT_Change) where x is a constant such as 0.9. In other words, WAT_Trend is an exponential moving average, which determines if WAT is trending downward or upwards and at what rate. If WAT is trending downwards, this is a positive sign that conditions may be improving for this service location 120. All other things being equal, a service location 120 that is showing the best signs of improvement is preferred. Next, the calculated WAT_Trend for the service location 120 is recorded (step 512). At step 516, a determination is made as to whether additional service locations 120 are available. For example, a determination of whether an additional service location having a greatest or sufficient probability of completing work within the target time is available may be made. If an additional service location 120 is available, the system gets the next service location 120 (step 520) and returns to step 500. If an additional service location 120 is not available, the service location 120 having the lowest calculated WAT_Trend is set equal to the service location 120 having the most favorable advance time metric (step 524). The process for determining an advance time metric then ends (step 528).

In accordance with another embodiment of the present invention, the advance time metric used to select one of a number of service locations 120 having a greatest probability, or a sufficient probability, for servicing the work within the target service time at step 316 of FIG. 3 is the estimated wait time associated with each service location. In particular, the work is assigned to the service location 120 included among the service locations 120 determined to have the greatest or a sufficient probability with the lowest estimated wait time. According to such an embodiment, at step 316 of FIG. 3, the service location 120 having the lowest expected wait time is selected from the service locations 120 having the greatest or a sufficient probability of servicing the work within the target time.

As can be appreciated from the foregoing description, multiple service locations 120 may be determined to have a greatest probability of servicing work within a target time period if more than one service location 120 is determined to have the highest calculated probability. Thus, in connection with embodiments of the present invention in which relative probability is calculated as a number of opportunities to complete work within a target time period, multiple service locations 120 have the highest probability if they have the same highest number of opportunities. For example, if a first service location is determined to have three opportunities, a second service location 120 is also determined to have three opportunities, and a third and final service location 120 is determined to have two opportunities, the first and second service locations 120 each have the same greatest probability of servicing the work within the target time.

As can also be appreciated from the foregoing description, multiple service locations 120 may be determined to have a sufficient probability of servicing work within a target time if the calculated number of opportunities exceeds a number preselected as being sufficient. For example, if three opportunities to service work within a target time is selected as representing a sufficient probability that the work will be serviced within the target time, and a first service location 120 is determined to have four opportunities, a second service location 120 is determined to have three opportunities, and a third and final service location 120 is determined to have two opportunities, the first and second service locations 120 both have a sufficient probability of servicing the work within the target time.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A computer-implemented method for balancing resource loads, comprising:
receiving a work request;
determining for each of a plurality of service locations a probability of servicing said work request within a target time, wherein said determined probability includes determining a relative probability for each service location included in the plurality of service locations by calculating a number of opportunities to service said work request within said target time by each service location included in the plurality of service locations, wherein said number of opportunities is calculated as a function of a weighted advance time (WAT), where WAT is a weighted advance time for a work request assigned to said service location;
selecting at least a first service location having at least one of a greatest determined probability of servicing said work request within said target time and a sufficient determined probability of servicing said work request within said target time; and assigning said work request to said selected service location.

2. The method of claim 1, wherein said step of selecting at least a first service location comprises selecting a first service location having a sufficient determined probability of servicing said work request within said target time.

3. The method of claim 1, wherein said step of selecting at least a first service location comprises selecting a first service location having a greatest determined probability of servicing said work request within said target time.

4. The method of claim 1, wherein selecting at least a first service location comprises selecting a first service location having at least a selected minimum number of opportunities to service said work request within said target time.

5. The method of claim 1, wherein said step of selecting at least a first service location comprises selecting a first service location having a greatest number of opportunities to service said work request within said target time.

6. The method of claim 1, wherein said number of opportunities (#OPPS) is calculated as #OPPS=((Target time-EWT)/WAT)+1, where EWT is an estimated wait time for a work request assigned to said service location, and where WAT is a weighted advance time for a work request assigned to said service location.

7. The method of claim 1, further comprising, in response to more than one service location having a greatest calculated number of opportunities to service said work request within said target time, calculating an advance time metric.

8. The method of claim 7, wherein said advance time metric comprises an expected wait time, wherein said step of selecting comprises selecting a location having a lowest expected wait time.

9. The method of claim 7, wherein said advance time metric comprises a weighted advance time trend, wherein said step of selecting comprises selecting a location having a lowest weighted advance time trend.

10. The method of claim 9, wherein said weighted advance time trend (WAT_Trend) is calculated as WAT_Trendn= (x*WAT_Trendn−1)+((1−x)*WAT_Change), where x is a constant, and where the WAT_Change is calculated as WAT_Change=(WATn-WATn-1)/WATn-1.

11. The method of claim 1, wherein each of said service locations is associated with a queue capable of containing a plurality of work requests.

12. The method of claim 1, wherein said selected service location comprise at least one split.

13. A load-balancing apparatus, including a hardware processor and memory, comprising:
  means for receiving a work request;
  means for calculating a probability that a service location is capable of servicing said work request within a target time, wherein said means for calculating a probability includes means for calculating a number of opportunities to service said work request within said target time with respect to a service location, wherein said number of opportunities is calculated as a weighted advance time (WAT), where WAT is a weighted advance time for a work request assigned to said service location;
  means for selecting a service location having at least one of a highest probability of servicing said work request within said target time and a sufficient probability of servicing said work request within said target time; and
  means for allocating said work request to said selected service location.

14. The apparatus of claim 13, wherein said service location is associated with a queue and comprises at least one associated resource.

15. The apparatus of claim 13, wherein said service location comprises a split.

16. The apparatus of claim 13, further comprising means for calculating an advance time metric.

17. A work allocation apparatus, comprising:
  a plurality of service locations;
  a plurality of service resources, wherein at least a one of said service resources is associated with each of said service locations;
  a communication network interface, operable to receive work requests; and
  a hardware processor implementing a controller, wherein said controller operates to calculate a relative probability that a work request will be serviced within a target time for each service location included in the plurality of service locations, wherein said relative probability is determined for a service location by calculating a number of opportunities to service said work request within a predetermined target time, wherein said number of opportunities is calculated as a function of a weighted advance time (WAT), where WAT is a weighted advance time for a work request assigned to said service location, wherein a work request received at said communication network interface is assigned to a service location having at least one of a highest probability of servicing said work request within said predetermined target time and a sufficient probability of servicing said work request within said predetermined target time.

18. The apparatus of claim 17, wherein said service resources comprise service agents.

19. The apparatus of claim 17, wherein said service resources are organized into splits.

20. The apparatus of claim 17, wherein said work request is associated with a request for assistance.

21. The apparatus of claim 17, wherein said communication network interface is interconnected to at least one of an Internet protocol network and a public switched telephone network.

22. The apparatus of claim 17, wherein said service locations each comprise a server.

23. A computer storage medium containing instructions, when executed by a processor, to perform the method comprising:
  receiving a work request;
  calculating for each of a plurality of service locations a relative probability that said work request will receive service within a target time period, wherein said calculated probability comprises a calculated number of opportunities that a service location will have to service said work request within said target time period, wherein said number of opportunities is calculated as a function of an expected wait time (EWT) for said service location;
  selecting at least one a one of said plurality of service locations having at least one of a greatest probability of servicing said work request within said target time period and a sufficient probability of servicing said work request within said target time period; and
  assigning said work request to one of said selected service locations.

24. The method of claim 23, wherein said number of opportunities (#OPP) is given by: #OPP=((Target time-EWT)/WAT)+1, where EWT is an expected wait time for said service location, and where WAT is a weighted advance time for said service location.

25. The method of claim 23, further comprising: in response to a number of service locations having an equal calculated probability, calculating an advance time metric for each of said number of service locations.

26. The method of claim 25, wherein said calculating an advance time metric comprises:
  calculating a weighted advance time;
  calculating a weighted advance time change;
  calculating a weighted advance time trend; and
  wherein said step of selecting a one of said plurality of service locations comprises selecting a service location with a lowest calculated weighted advance time trend.

27. The method of claim 26, wherein said weighted advance time change (WAT_Change) is given by WAT_Change=(WATn-WATn-1)/WATn-1, where WATn is the weighted advance time most recently calculated, and where WATn-1 is a previously calculated weighted advance time, wherein said weighted advance time trend (WAT_Trend) is given by WAT_Trendn=(x*WAT_Trendn-1)+((1-x)*WAT_Change), where x is a constant.

28. The method of claim 25, wherein said calculating an advance time metric comprises calculating an estimated waiting time.

29. The method of claim 23, further comprising: selecting a target time for servicing a work request.

30. The apparatus of claim 13, wherein said number of opportunities (#OPPS) is calculated as #OPPS=((Target time-EWT)/WAT)+1, where EWT is an estimated wait time for a work request assigned to said service location, and where WAT is a weighted advance time for a work request assigned to said service location.

31. The apparatus of claim 17, wherein said number of opportunities (#OPPS) is calculated as #OPPS=((Target time-EWT)/WAT)+1, where EWT is an estimated wait time for a work request assigned to said service location, and where WAT is a weighted advance time for a work request assigned to said service location.

32. The method of claim 23, wherein said number of opportunities (#OPP) is given by: #OPP=((Target time-EWT)/WAT)+1, where EWT is an estimated wait time for a work request assigned to said service location, and where WAT is a weighted advance time for a work request assigned to said service location.

* * * * *